United States Patent

[11] 3,595,539

[72] Inventors Takuhei Kimura; Shinichi Isigaki, both of Tokyo, Japan
[21] Appl. No 2,074
[22] Filed Jan. 12, 1970
[45] Patented July 27, 1971
[73] Assignee Iwatsu Electric Co., Ltd. Tokyo, Japan
[32] Priority Feb. 21, 1969
[33] Japan
[31] 44-12547

[54] THERMAL APPARATUS FOR FIXING THERMOPLASTIC RESINOUS POWER
8 Claims, 16 Drawing Figs.

[52] U.S. Cl. .......... 263/6 E, 100/93
[51] Int. Cl. .......... G03g 13/20, G03g 15/20
[50] Field of Search .......... 263/6, 6 E; 219/388; 100/93

[56] References Cited

UNITED STATES PATENTS

| | | | |
|---|---|---|---|
| 3,331,592 | 7/1967 | Cassano et al. .......... | 263/6 E |
| 3,409,280 | 11/1968 | Springett .......... | 263/6 E |
| 3,437,032 | 4/1969 | Manghirmalani et al. .. | 263/6 E X |

*Primary Examiner*—Charles J. Myhre
*Attorney*—Milton J. Wayne

ABSTRACT: A thermal apparatus for fixing thermoplastic resinous powder which has an improved heating surface whereon numerous specifically patterned and arranged fine recesses and protuberances are formed. The specific recesses and protuberances are very effective for eliminating accidental transfer of a resinous layer, to be fixed on an article's surface, onto the heating surface. The thermal fixing apparatus is useful for electrophotography, electrostatic printing, powder-painting, powder-photogravure and powder-screen printing.

ATTORNEY

ATTORNEY

ATTORNEY

THERMAL APPARATUS FOR FIXING THERMOPLASTIC RESINOUS POWER

Figure 1:
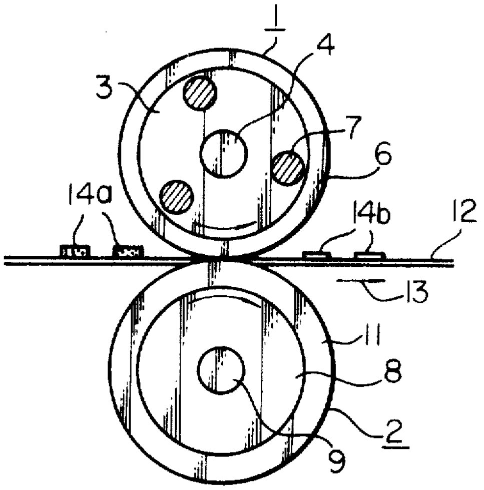

The present invention relates to a thermal apparatus for fixing thermoplastic resinous powder having an improved heating surface, more particularly relates to a thermal apparatus for fixing thermoplastic resinous powder having an improved heating surface on which numerous specifically patterned and arranged fine recesses and protuberances are formed, the recesses and protuberances are excellently effective for presenting the heating surface from accidental transfer of the resinous layer to be thermally fixed on an article's surface.

Recently, a new method has been developed concerning formation of a desired resinous layer on a specific article's surface. In this new resinous layer forming process, resinous powder is firstly deposited on the proposed article's surface in a preset disposition, and then the deposited resinous powder layer is fixed onto the article's surface in a proper manner. This newly developed art is now displaying an aggressive penetration into the fields of electrophotography, electrostatic printing, powder-painting, powder-photogravure and powder-screen printing etc.

Solvent fixing and thermal fixing are well-known as methods effective for fixing resinous powder or pigmented resinous powder onto a given article's surface. The thermal fixing is usually carried out by heat-fusing the resinous powder utilizing (a) radiant rays or (b) a high temperature heating surface.

The thermal fixing apparatus having the heating surface is adapted for the thermoplastic resinous powder in various fields, for example, electrophotography. In such an apparatus, the fixing is carried out through a contact of its heating surface with a thermoplastic resinous powder layer deposited on the article's surface.

In electrophotography, a base sheet, on whose surface the purposed thermoplastic resinous powder is to be fixed, is advanced between a pair of rollers rotating at a same rotational speed in a mutually contacting arrangement. This pair of rollers' assembly consists of a heating roller and a presser roller arranged in a contacting condition. The heating roller is peripherally provided with a heating surface. Prior to processing through the system, the specific article's surface is provided with prescribedly deposited resinous powder. With advance of the sheet article, the sheet article is introduced between the pair of rollers, the heating surface contacts the sheet article's surface and thermoplastic resinous powder on the surface is thermally fused to be fixed thereon.

This thermal fixing apparatus is quite simple in its mechanical construction and operation having an advantage of relatively high degreed thermal efficiency. However, this fixing apparatus is also provided with a fatal drawback. That is, through contact of the heating surface with the resinous powder, the resinous layer formed on the sheet article is apt to be accidentally transferred from the sheet article's surface onto the heating surface. The transferred resinous layer moves in a thermally fused condition, with the rotation of the heating roller and, the next time, the resinous layer adhering to the heating surface comes in contact with a successive sheet article's surface, the fused resinous layer again is accidentally transferred back onto the preceding sheet article's surface. As mentioned above, this transferring of the resinous layer takes place accidentally and randomly. So, such reverse transferring of the resinous layer, that is, return of the resinous layer from the heating surface onto the undesirable portion of the sheet article's surface, inevitably disturbs the originally prescribed disposition of the thermoplastic resinous powder on the article's surface. The above-described disturbance of the original powder's disposition due to the accidental transfer thereof, is a fatal drawback of the heating surface—article's surface—contact-type conventional thermal fixing system.

Several methods have been proposed for solving the problem of undesirable transferring of a resinous layer during the thermal fixing operation. One of the methods includes coating the heating surface of the heating roller with an antitransferring agent such as flourine-contained resin or applying silicone grease onto the heating surface. However, even such conventionally proposed methods are still provided with drawbacks such as revealed in the following.

In the first place, such covering of the heating surface with the additional substance layer tends to lower the thermal efficiency in the fixing operation. That is, effective transmission of heat from the heating surface to the thermoplastic resinous powder is obstructed by the presence of the lesser thermal conductive substance layer. Secondly, since such a lesser thermal conductive substance is not durable against successive thermal attacks at a temperature exceeding 300° C., there is a limitation in the employable fixing temperature, in practical procedures. This limitation in the fixing temperature forms a bar in the speeding up of the fixing operation's speed. Thirdly, such a covering layer is generally less durable against externally applied mechanical attack. Cracks on the layer inevitably causes undesirable fixing results. So, utilizing such a coating technique, particular care is required for keeping the heating surface away from external mechanical attack.

A principal object of the present invention is to provide a thermal apparatus for fixing thermoplastic resinous powder excellent in the elimination of undesirable transferring of the resinous layer formed on the article's surface onto the heating surface.

Another object of the present invention is to provide a thermal apparatus for fixing thermoplastic resinous powder having enhanced thermal efficiency in the fixing operation.

A further object of the present invention is to provide a thermal apparatus for fixing thermoplastic resinous powder durable against long time utilization thereof, while retaining a refined fixing result even after repeated use.

A still further object of the present invention is to provide a thermal apparatus for fixing thermoplastic resinous powder which can be operated with a minimum of supervision.

In conformity to the above-listed objects, the thermal fixing apparatus of the present invention is provided with a heating surface on which numerous, specifically patterned, fine recesses and protuberances are formed. Design of the recesses and protuberances are characterized by defining correlation between constructional dimensions of the recesses in a manner hereinafter described in detail.

Figure 2A:
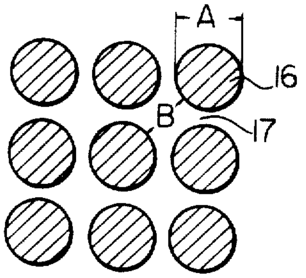
Figure 2B:
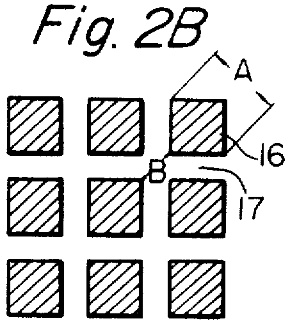
Figure 2C:
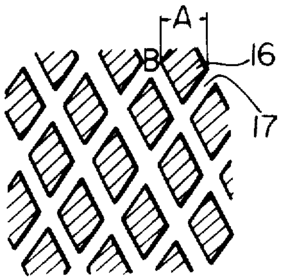

Further features and advantages of the art of the present invention will be clarified in the following description, reference being made to the accompanying drawings, in which FIG. 1 is a simplified explanatory side view of an embodiment of a thermal fixing apparatus of the present invention, FIGS. 2A, 2B and 2C are explanatory plan views of several embodiments of recesses and protuberances to be formed on a heating surface of the fixing apparatus shown in FIG. 1, FIGS. 3A, 3B and 3C are explanatory plan views of other embodiments of recesses and protuberances to be formed on the heating surface of the fixing apparatus shown in FIG. 1, FIGS. 4A, 4B and 4C are side-sectional views of the recesses and protuberances to be formed on the heating surface of the thermal fixing apparatus, FIGS. 5A to 5F show several modes of the thermoplastic resinous powder's thermal fixing operation, some of which employ the art of the present invention, while others of which fall outside the art of the present invention.

Referring to FIG. 1, an embodiment of the thermal fixing apparatus of the present invention is illustrated. In the embodiment, a pair of rollers 1 and 2 is located in a vertically contacting arrangement. The upper roller forms a heating roller 1 and the lower roller forms a presser roller 2 and both rollers rotate at the same velocity in a direction shown with arrows in the drawing. The heating roller 1 is provided with a core 3 mounted on a rotatable shaft 4, a thermally conductive metallic layer 6 peripherally covering the core 3 and thermal sources 7 embedded in the core 3 for heating the metallic layer 6 to a desired temperature. This metallic layer 6 forms the previously mentioned heating surface of the heating roller 1. The presser roller 2 is provided with a core 8 mounted on a rotatable shaft 9 and a peripheral covering layer 11 of an elastic nature. This covering layer 11 forms a presser surface of the presser roller 2.

In the above-described mechanical arrangement, a sheet article 12, on which resinous powder is to be fixed, is processed from left to right in the drawing, as shown with an arrow 13, being sandwiched by the surfaces of the rollers 1 and 2. At positions upstream of contact of both rollers' surfaces, the thermoplastic resinous powder forms resinous powder layers 14a on the upper surface of the sheet article 12 in a predesigned arrangement and are advanced toward the contact of both rollers' surfaces with movement of the sheet article 12. While passing through the contact of the rollers' surfaces, the thermoplastic resinous powder layers 14a are thermally fused and fixed on the surface of the sheet article 12 due to contact with the heating surface of the heating roller 1. Coming out downstream of the surfaces' contact, the sheet article's surface is now provided with stably fixed resinous films 14b, due to the solidifying of the fused resinous layers 14a.

In the art of the present invention, the heating roller 1 is further characterized by having a heating surface on which numerous specifically shaped fine recesses are formed. That is, the metallic layer 6 of the heating roller 1 is provided with a plurality of recesses formed on its peripheral surface thereof in a prescribed condition.

Some examples of such formed recesses are illustrated in FIGS. 2A, 2B and 2C. In the example shown in FIG. 2A, the heating surface, that is, the surface of the metallic layer 6, is provided with numerous fine protuberances 16 of an almost round lateral cross-sectional profile and a connected recess 17 around the protuberances. In the example shown in FIG. 2B, the protuberances 16 are provided with an almost square, lateral cross-sectional profile. In the further example shown in FIG. 2C, the protuberances 16 are provided with an almost diamond-shaped, lateral cross-sectional profile. The lateral cross-sectional profile of the protuberances 16 may be deviated from those mentioned and, in some cases, may be polygonal, such as triangular, rectangular, hexagonal, star-shaped, elliptical or irregular-shaped. In the illustrated examples, the protuberances 16 are arranged in a refined order. However, the operational effect of the art of the present invention is not lowered if the arrangement is deviated, even to an appreciable extent, from such a refined order. For example, they can be arranged in a concentric order or in a scroll-work order.

Figure 3A:
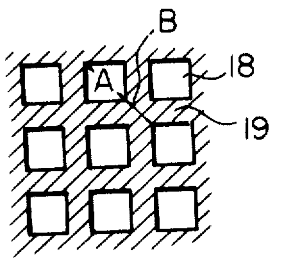
Figure 3B:
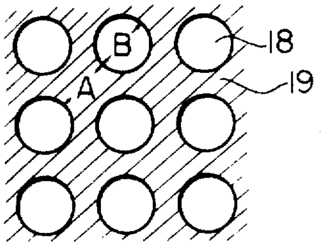
Figure 3C:
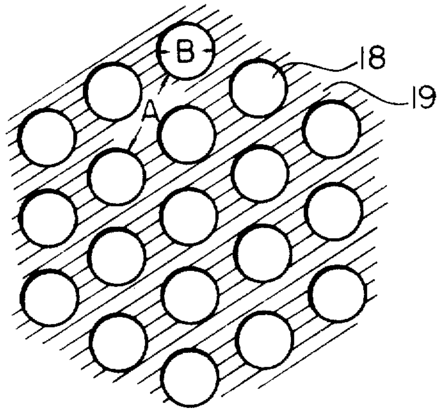

Another embodiment of the recessed heating surface of the present invention is shown in FIGS. 3A, 3B and 3C. In the embodiment shown in FIG. 3A, numerous recesses 18 of an almost square, lateral cross-sectional profile are formed on the heating surface of the metallic layer 6 in predesignated positions. Thus, a connected protuberance 19 is formed around the recesses 18. In the example shown in FIG. 3B, the lateral cross-sectional profile is formed as almost round. Further variations of the lateral cross-sectional profile and the recesses' arrangement are employable as in the case of the foregoing examples without departing from the technical scope of the art of the present invention. The further example shown in FIG. 3C, that is, the predesignated positioned recesses 18, are arranged in a concentric hexagonal order.

Figure 4A:
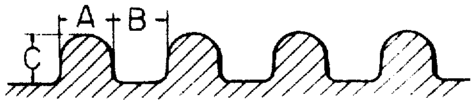
Figure 4B:
Figure 4C:
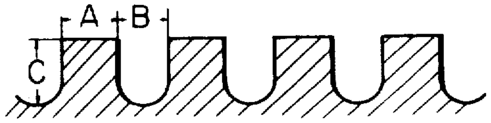

Referring to FIGS. 4A, 4B and 4C, several examples of the vertical cross-sectional mode of the recessed heating surface of the present invention are presented. As is understood from this presentation, the protuberances and recesses on the heating surface can be provided with variously modified vertical cross-sectional profiles in conformity with the requirements in the actual fixing operation.

Now, the correlation definition among the constructional dimensions of the recessed heating surface will be explained in connection with the previously presented examples.

Provided that, as is shown in the drawings, the maximum distance between the fringes of a pair of recesses sandwiching an intervening protuberance is "$A$," the maximum distance between the fringes of a pair of protuberances sandwiching an intervening recess is "$B$" and the maximum depth of the recess is "$C$," *then, in the apparatus of the present invention, the values $A$, $B$* and $C$ shall be in a range from 10 to 300$\mu$. Further, the following correlation is required to exist between the values.

$$0.4A \leq B \leq 2A$$

$$0.8A \leq C$$

Selection of the definite values of $A$, $B$ and $C$ is accomplished in accordance with the particle size and kind of thermoplastic resinous powder used, type of sheet article to be processed and degree of the applied fixing temperature.

So far, theoretical background for supporting the success of the present invention has not been completely confirmed by the inventors of the present invention. However, according to research results obtained by the inventors, the following facts are estimated to be the reason for the success. Firstly, the effective heating surface area for contact with the thermoplastic resinous powder, decrease, owing to the provision of the recesses. Secondly, when the resinous powder is fused by contact with the heating surface and the fused resin drop wets the contacted heating surface, the contact angle of the fused resin drop, with respect to the effective heating surface, decreases by provision of the recesses. Thirdly, the surface tension appearing on the surface portion of the resinous drop not contacting the heating surface, tends to promote the complete removal of the resinous drop from the contacting surface when the fused resinous layer leaves its contacting condition with the heating roller's surface.

Figure 5A:
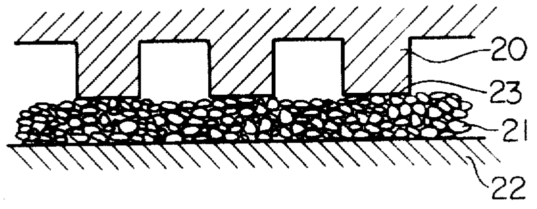
Figure 5B:
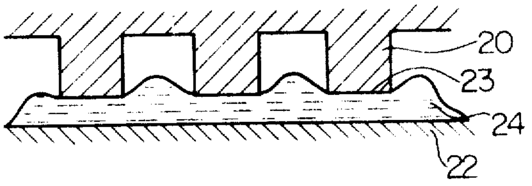
Figure 5C:
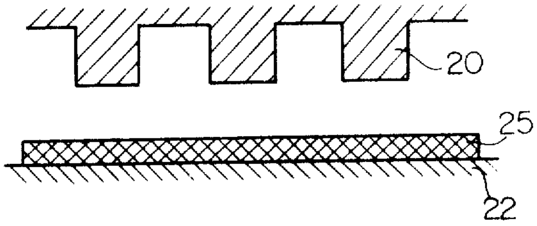

Referring to FIGS. 5A to 5C, some examples of the process for thermoplastic resinous powder by the apparatus provided with the recessed heater surface according to the present invention is shown. In the drawings, the contacting condition between the heating protuberances 20 of the heating surface and resinous powder layer 21 formed on the surface of sheet article 22 is shown in an enlarged illustration. At the stage shown in FIG. 5A, the heating protuberances 20 come in contact with the resinous powder layers 21 and then the resinous layers 21 begin to fuse on the contacting surface 23 of the heating protuberances 20. If the heating surface's temperature is retained sufficiently high, the portion of the resinous powder layer remotely away from the contacting surface also begins subsequently to fuse and, resultingly, the fused resin forms a fused resinous layer 24 as is shown in FIG. 5B. Next, by removing the heating protuberances 20 from thus formed fused resinous layer 24, as is shown in FIG. 5C, the fused resinous layer 24 is flattened due to its surface tension and solidified to form a flatly fixed resinous layer 25 on the surface of the sheet article 22.

As is already described, magnitude of the values $A$, $B$ and $C$ is selected in view of the particle size of the resinous powder. In general, the larger the particle size, the larger the value $A$ and vice versa. In this regard, however, the value of $A$ exceeding 300$\mu$ naturally makes the values of $B$ and $C$ larger than 240$\mu$, respectively. That is, the heating surface results in a considerably roughened condition. So, the time necessary for sufficient fusion of the resinous powder not directly contacting the heating surface is considerably elongated. This elongation of the perfect fusion time inevitably causes a delay in the completion of the thermal fixing operation, which forms an obstacle in the speeding up of the actual thermal fixing operation.

On the contrary, if the value of $A$ is smaller than 10$\mu$, it may be necessary to select a fine resinous powder, whose particle size is accordingly small, in order to obtain sufficient fixing results. This undesirable minimization of the particle size often causes difficulty in the manufacturing of the optimum resinous powder and in practical application thereof.

The following relationship is required to exist between the values $A$ and $B$.

$$0.4A \leq B \leq 2A$$

Figure 5D:
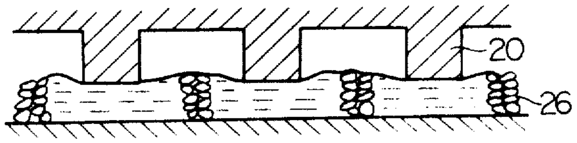

In case the value of B becomes smaller than 0.4 $A$, the heating surface area contacting the fused resinous layer increases accordingly creating an undesirable transferring of the resinous layer formed on the sheet article. While when the value of $B$ exceeds $2A$ the powder layer positioned remotely away from the direct contacting surface partly remains in an unfused condition as is shown in FIG. 5D. that is, the unfused resinous layers 26 are not fixed completely on the sheet article 22.

In addition to the above-described relationship between the values $A$ and $B$, the following relationship is required to exist between the values $A$ and $C$ $$0.8A \leqq C$$

Figure 5E:
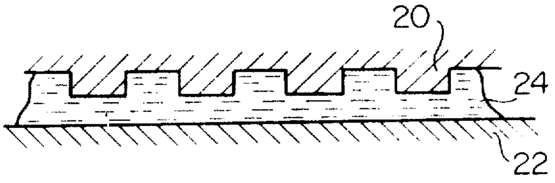
Figure 5F:
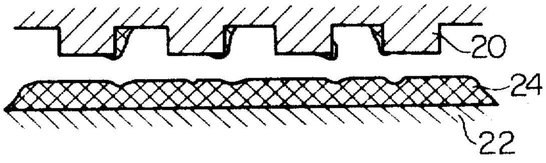

In case the value of $C$ is smaller than 0.8 $A$, the fused resin layer 24 comes in contact with the surface of the recesses as is shown in FIG. 5E, and the total contacting surface area undesirably becomes larger than that in the case of a flat heating surface. Then, at the time of removal of the heating surface from the fused resinous layer, some of the fused resin adheres to the heating surface and is apt to be drawn away from the fused resinous layer 24, as is shown in FIG. 5F, that is, undesirable transferring of the resin results as in the case of the conventional thermal fixing apparatuses.

The heating surface employable in the art of the present invention may be presented, not only in the form of a heating roller shown in FIG. 1, but also, in the form of a flat press-type heating plate. Any kind of material may be used for forming the heating surface as far as it has a highly degreed thermal conductivity and an acceptable adaptability to surface recessing treatments. Generally, the heating surface is made of copper, copper alloys and iron alloys with preferable results.

Formation of the recesses on the heating surface can be carried out by utilizing, for example, the art of engraving, etching, embedding of metallic balls, liquid honing and covering by wire wheels or metallic nets.

The thermal fixing apparatus of the present invention is applicable for thermally fixing various kinds of resinous powders which fuse at 110 to 280° C. without any chemical decomposition and closely adheres to the sheet article.

The resins usable for this thermal fixing are polystyrene, acrylic esters, methacrylic esters, resin-modified polyesters, modified xylol resins and polycarbonates.

The following examples are illustrative of the present invention but are not to be construed as limiting the same.

Examples 1, 2, 3 and 4

A powdered polystyrene resin including pigment particles were deposited on electrostatic latent images previously formed on a specimen paper sheet surface by an electrophotographic technique. Thus prepared specimen sheet was processed through a thermal fixing apparatus at a fixing temperature of 200° C for the fixing operation. The thermal fixing apparatus was provided with various types of heating surfaces recessed in dimensions shown in Table 1.

TABLE 1.—FEATURES OF HEATING SURFACE USED

| Heating surface used | Lateral cross-sectional profile of heating surface | Vertical cross-sectional profile of heating surface | Dimensions A, in μ | Dimensions B, in μ | Dimensions C, in μ | Note |
|---|---|---|---|---|---|---|
| A | FIGURE 2A | FIGURE 4B | 30 | 30 | 30 | For present invention. |
| B | do | FIGURE 4A | 50 | 80 | 80 | |
| C | FIGURE 3A | FIGURE 4C | 100 | 100 | 80 | |
| D | FIGURE 3C | FIGURE 4A | 200 | 100 | 200 | |
| E | FIGURE 2A | FIGURE 4B | 8 | 8 | 8 | For comparison. |
| F | FIGURE 2B | FIGURE 4A | 50 | 200 | 80 | |
| G | FIGURE 3A | FIGURE 4C | 100 | 100 | 50 | |
| H | FIGURE 3C | FIGURE 4A | 200 | 50 | 100 | |

For each type of heating surface A, B, C and D, one hundred specimen paper sheets were tested and the frequency of transfer accidents and fixation results were evaluated. For the purpose of comparison, the testing was performed using an additional four types of heating surfaces, E, F, G and H listed in Table 1. The obtained results were as is shown in Table 2.

As is apparent from the results shown in the table, employment of the art of the present invention assures remarkably improved fixing results with considerable elimination of transfer accidents when compared with those in the conventional fixing arts.

TABLE 2

| Example No. | Heating surface used | Frequency of transfer accidents per 100 sheets | Fixation results |
|---|---|---|---|
| Present Example: | | | |
| 1 | A | 0 | Complete. |
| 2 | B | 0 | Partly incomplete. |
| 3 | C | 0 | Complete. |
| 4 | D | 0 | Do. |
| Comparison Example: | | | |
| 1 | E | 30 | Do. |
| 2 | F | 63 | Incomplete. |
| 3 | G | 76 | Complete. |
| 4 | H | 94 | Do. |

Examples 5, 6, 7 and 8

In a powdery gravure printing process, checkered patterns of 4 cm. square were printed with a pigmented resinous powder on a paper sheet of 30 cm. width. These printed paper sheets were processed through the thermal fixing apparatus shown in FIG. 1 having heating surfaces A, B, C and D defined in the preceding examples for fixing of the patterned resinous powder layers and frequency of transfer accidents was evaluated together with fixation results. Together with this, paper sheets of the same nature were processed through the same thermal fixing apparatus having comparison heating surfaces E, F, G and H. The obtained results were as is shown in Table 3. In the present and comparison examples, resin-modified polyester resinous powder was used and the fixing temperature was 250° C.

TABLE 3

| Example No. | Heating surface | Frequency of transfer accidents | Fixation results |
|---|---|---|---|
| Present example: | | | |
| 5 | A | 0 | Complete. |
| 6 | B | 0 | Partly incomplete. |
| 7 | C | 0 | Complete. |
| 8 | D | 0 | Do. |
| Comparison example: | | | |
| 5 | E | 43 | Do. |
| 6 | F | 68 | Incomplete. |
| 7 | G | 80 | Complete. |
| 8 | F | 95 | Do. |

As is well indicated from the results shown in Table 3, a complete fixation effect together with comparatively no transfer accidents can be attained by employing the new and improved thermal apparatus of the present invention.

We claim:

1. A thermal apparatus for fixing thermoplastic resinous powder having an improved heating surface on which fine recesses and protuberances are formed satisfying the relationship:

$$0.4A \leqq B \leqq 2A$$

and $$0.8A \leqq C$$

wherein $A$ represents a maximum distance between fringes of said recess portions facing through intervening protuberance portions, B represents a maximum distance between fringes of said protuberance portions facing through an intervening recess portion and C represents a maximum depth of said recess.

2. A thermal fixing apparatus as claimed in claim 1, wherein said values *A*, *B* and *C* are defined in a range from 10 to 300 $\mu$, respectively.

3. A thermal fixing apparatus as claimed in claim 1, wherein said heating surface is formed on a peripheral surface of a rotatable heating roller.

4. A thermal fixing apparatus as claimed in claim 1, wherein said heating surface is intimately contacted with the surface of a base sheet article so as to fuse and fix thereon said thermoplastic resinous powder.

5. A thermal fixing apparatus as claimed in claim 4, wherein said base sheet article is passed between a heating and pressing roller rotating at substantially the same rotational speed in a mutually contacting arrangement.

6. A thermal fixing apparatus as claimed in claim 1, wherein the protuberances are of a substantially round, square or diamond lateral cross-sectional profile.

7. A thermal fixing apparatus as claimed in claim 1, wherein the recesses are substantially square or round lateral cross-sectional profile.

8. A thermal fixing apparatus as claimed in claim 4 wherein said base article sheet is processed through the thermal fixing apparatus at a temperature between about 110° and 280° C.